United States Patent
Choudhury et al.

(10) Patent No.: US 11,488,007 B2
(45) Date of Patent: Nov. 1, 2022

(54) BUILDING OF CUSTOM CONVOLUTION FILTER FOR A NEURAL NETWORK USING AN AUTOMATED EVOLUTIONARY PROCESS

(71) Applicant: International Business Machines Corporation, Armonk, NY (US)

(72) Inventors: Mihir Choudhury, New York, NY (US); Atin Sood, Jersey City, NJ (US); Ruchir Puri, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 16/705,488

(22) Filed: Dec. 6, 2019

(65) Prior Publication Data

US 2021/0174175 A1    Jun. 10, 2021

(51) Int. Cl.
*G06N 3/063* (2006.01)
*G06N 3/08* (2006.01)
*G06N 3/04* (2006.01)

(52) U.S. Cl.
CPC .............. *G06N 3/063* (2013.01); *G06N 3/04* (2013.01); *G06N 3/08* (2013.01)

(58) Field of Classification Search
CPC   G06N 3/063; G06N 3/04; G06N 3/08; G06N 3/082; G06N 3/0454
See application file for complete search history.

(56) References Cited

U.S. PATENT DOCUMENTS

| | | |
|---|---|---|
| 5,280,564 A | 1/1994 | Shiomi et al. |
| 7,603,329 B2 | 10/2009 | Wocke et al. |

(Continued)

FOREIGN PATENT DOCUMENTS

| | | |
|---|---|---|
| CN | 101694701 A | 4/2010 |
| CN | 106485324 A | 3/2017 |
| CN | 107392314 A | 11/2017 |

OTHER PUBLICATIONS

Islam, M. M., Sattar, M. A., Amin, M. F., Yao, X., & Murase, K. (2009). A new adaptive merging and growing algorithm for designing artificial neural networks. IEEE Transactions on Systems, Man, and Cybernetics, Part B (Cybernetics), 39(3), 705-722. (Year: 2009).*

(Continued)

*Primary Examiner* — Brian M Smith
*Assistant Examiner* — Henry Trong Nguyen
(74) *Attorney, Agent, or Firm* — Stephen J. Walder, Jr.; Anthony M. Pallone (57) ABSTRACT

Mechanisms are provided for synthesizing a computer implemented neural network. An initially trained neural network is received and modified by introducing a new hidden layer of neurons and new connections that connect the new hidden layer of neurons to an output layer and a previous layer of neurons previously directly connected to the output layer of neurons to generate a modified neural network. The modified neural network is trained through one or more epochs of machine learning to generate modified weight values for the new connections and the new connections are pruned based on the modified weight values to remove a subset of the new connections and leaving remaining connections in the modified neural network. A merge operation is performed on the remaining connections in the modified neural network to generate a custom convolution filter and modified neural network. The modified neural network is then retrained for deployment.

18 Claims, 6 Drawing Sheets

(56) References Cited

U.S. PATENT DOCUMENTS

| | | | | |
|---|---|---|---|---|
| 10,515,306 | B1* | 12/2019 | David | G06N 3/08 |
| 11,250,327 | B2* | 2/2022 | Liang | G06N 3/04 |
| 2018/0268284 | A1 | 9/2018 | Ren et al. | |
| 2018/0276532 | A1 | 9/2018 | Kim et al. | |
| 2018/0307987 | A1 | 10/2018 | Bleiweiss et al. | |

OTHER PUBLICATIONS

Suganuma, M., Shirakawa, S., & Nagao, T. (Jul. 2017). A genetic programming approach to designing convolutional neural network architectures. In Proceedings of the genetic and evolutionary computation conference (pp. 497-504). (Year: 2017).*

Zhang, Q., Wang, T., Tian, Y., Yuan, F., &Xu, Q. (Mar. 2015). ApproxANN: An approximate computing framework for artificial neural network. In 2015 Design, Automation & Test in Europe Conference & Exhibition (DATE) (pp. 701-706). IEEE. (Year: 2015).*

Kearney, W. T. (2016). Using genetic algorithms to evolve artificial neural networks. (Year: 2016).*

Dai, Xiaoliang et al., "NeST: A Neural Network Synthesis Tool Based on a Grow-and-Prune Paradigm", IEEE Transactions on Computers, Nov. 2017, submitted version arXiv: 1711.02017v3 [cs.NE], Jun. 1, 2018, 13 pages.

Kim, Suhyun, "A Beginner's Guide to Convolutional Neural Networks (CNNs)", Towards Data Science website, Feb. 14, 2019, 13 pages.

Li, Xingyi et al., "Filter Shaping for Convolutional Neural Networks", 5th International Conference on Learning Representations (ICLR 2017), Apr. 24 -26, 2017, 14 pages.

Prabhu, Raghav, "Understanding of Convolutional Neural Network (CNN)—Deep Learning", Towards Data Science website, Mar. 4, 2018, 8 pages.

* cited by examiner

BUILDING OF CUSTOM CONVOLUTION FILTER FOR A NEURAL NETWORK USING AN AUTOMATED EVOLUTIONARY PROCESS

BACKGROUND

The present application relates generally to an improved data processing apparatus and method, and more specifically to mechanisms for building a custom convolution filter for a neural network using an automated evolutionary process.

Artificial neural networks, or simply "neural networks," are computer models comprising a set of algorithms that are trained using a machine learning process and a set of training data, to perform various operations in artificial intelligence primarily directed to recognizing patterns in data. These artificial neural networks have been used successfully for various types of artificial intelligence operations including image recognition, object classification, predictive analysis, natural language processing, acoustic pattern recognition, speech synthesis and a plethora of other complex artificial intelligence operations.

The neural network emulates a biological neural network and human thought process using computer hardware/software configured in a specific manner to achieve a desired operation. The artificial neural network is composed of artificial neurons or nodes that are connected by links to one another, with the neurons or nodes being provided in different layers of the artificial neural network. To emulate biological neuron connections, weights are utilized in the artificial neural network where a positive weight reflects an excitatory connection, while a negative weight emulates an inhibitory connection. In the artificial neural network, for each neuron or node, all inputs to the neuron or node are modified by a weight and summed, which is referred to as a linear combination. An activation function is used to control the amplitude of the output, e.g., an acceptable range of output is usually between 0 and 1, or −1 and 1.

Simple artificial neural networks may be composed of a single input layer, a single hidden or middle layer, and a single output layer. However, more complex neural networks, referred to as deep neural networks (DNNs) may provide multiple layers between the input and output layers. Such DNNs can model complex linear and non-linear relationships. One type of deep neural network is referred to as a convolutional neural network (CNN). CNNs are regularized versions of multilayer perceptrons, where the term "multilayer perceptron" refers to fully connected networks where each neuron in one layer is connected to all neurons of the next layer. CNNs have been successfully used for image analysis, so much so that in other applications, input data may often be converted to an image representation for input to a CNN so that the CNN is able to classify the image of the data and thereby classify the underlying data which was converted to the image representation.

In convolutional neural networks (CNN) every network layer acts as a detection "filter" for the presence of specific features or patterns present in the input data, e.g., image data. The "convolution" in CNNs is an algorithm that specifies how an input is modified by a filter, e.g., how the value of each pixel in an image is modified by using information from neighboring pixels. For example, in a CNN performing image processing, multiple filters are used to slice an image and map each slice one by one to learn different portions of an input image, where the mapping generates an output each time a match to the filter is found in the input image. As an example, the input image data may be thought of as a matrix of pixels (e.g., 4×4 matrix of pixel values) and the filter may likewise be a filter specifying a recognizable pattern (e.g., 3×3 matrix of values). The filter is applied (e.g., matrix multiplication) to each portion of the input image data using a stride indicating the degree of movement of the filter along the input image in a horizontal and vertical manner (columns and rows in the input matrix). The resulting values from application of the filter to the input image data are stored as an output matrix, or feature map, that encodes the presence or absence, and degree of presence, of the feature it detects. For an overview of CNN operation, see Suhyun Kim, "A Beginner's Guide to Convolutional Neural Networks (CNNs)" and Prabhu, "Understanding of Convolutional Neural Network (CNN)—Deep Learning," both available at the Towards Data Science website.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for synthesizing a computer implemented neural network. The method comprises receiving an initially trained neural network comprising an initial set of weight values associated with connections in the initially trained neural network. The method further comprises modifying the initially trained neural network by introducing a new hidden layer of neurons and new connections that connect the new hidden layer of neurons to an output layer of neurons of the initially trained neural network and a previous layer of neurons previously directly connected to the output layer of neurons to generate a modified neural network. In addition, the method comprises training the modified neural network through one or more epochs of machine learning to generate modified weight values for the new connections, and pruning the new connections based on the modified weight values to remove a subset of the new connections and leaving remaining connections in the modified neural network. Moreover, the method comprises performing a merge operation on the remaining connections in the modified neural network to generate a custom convolution filter and modified neural network comprising the custom convolution filter, and retraining the modified neural network with one or more additional epochs of machine learning to generate a trained neural network, having the custom convolution filter, for deployment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Synthesizing neural network models for particular applications and datasets is a time consuming and resource intensive process, often requiring detailed knowledge of deep learning neural networks frameworks. Various techniques have been developed to assist with such synthesis of neural network models. Many of these existing techniques for automatically synthesizing neural networks use template layers, such as convolution, fully-connected, max-pool, average pool, etc. These template-based techniques work well for pre-processed and cleaned datasets, however, due to their parameter size, these techniques have a tendency to overfit to the training data, i.e. the analysis corresponds too closely or exactly to the particular training data and may therefore fail to fit additional data or predict future observations reliability.

Other techniques explore more "fine-grained" connections within neural networks. For example, Li et al. "Filter Shaping for Convolutional Neural Networks", ICLR 2017, describes a filter shaping technique that computes a co-variance metric to determine which features (inputs) should be combined to create a neural network filter. The filter shaping approach in Li et al. is restricted by the computational complexity of computing the co-variance matrix. Thus, the size of the neighborhood that can be searched using this technique is relatively small. Furthermore, the filter shaping technique of Li et al. looks to build a neural network layer by combining features that reduce function complexity, but it is not clear how reduction in functional complexity would result in better prediction accuracy. Experiments with implementation of the filter shaping algorithm indicate that, due to its computational cost, the covariance matrix computation cannot be scaled to large-feature datasets, like MNIST (a large database of handwritten digits used for training image processing systems) which has 784 features, without making certain approximations, such as reducing the window for computing the covariance matrix, which reduces prediction accuracy.

The illustrative embodiments provide mechanisms for building a custom convolution filter for a neural network using an automated evolutionary process. The mechanisms of the illustrative embodiments provide a supervised machine learning process that serves as an optimization towards automatically generating a neural network model. Specifically, given an input dataset with classification labels, the mechanisms of the illustrative embodiments incrementally add new connections and a small number of new trainable variables within a neural network to improve the prediction accuracy of the neural network. It should be appreciated that references to a "neural network" in the context of this description refers to an artificial neural network that is designed to be used to perform an artificial intelligence operation within a specifically configured computing system executing the necessary logic for implementing the artificial neural network.

The mechanisms of the illustrative embodiments use an evolutionary process for building a custom convolution filter of a neural network. In one illustrative embodiment, the evolutionary process comprises five phases. In phase 0, or the initialization phase, given a neural network that has been trained until early stopping criteria are met, a subset of neurons in the neural network are selected that are determined to be "important" for the given dataset and artificial intelligence operation being performed by the neural network, e.g., a classification task. Early stopping is a technique for controlling overfitting in machine learning models, especially neural networks, by stopping training before the weight values have converged. In some illustrative embodiments, the early stopping criteria is when the loss or error on the validation set has stopped decreasing.

In some illustrative embodiments, all the neurons present in the neural network in Phase 0 are considered important. However, in cases where the neural network in Phase 0 is large (e.g., the neural network has more than 10000 neurons), a subset of neurons may be considered "important" neurons to avoid having very large computation time for building a custom convolution filter. The method for choosing a subset of neurons is dependent on the dataset and the application in which the resulting neural network will be deployed. For example, principal component analysis (PCA) and analysis of variance (ANOVA) F-1 value are examples of techniques that can be used to select a subset of neurons.

In some illustrative embodiments, a neural network that has been trained until the early stopping criteria is met need not be given, and instead a default starting neural network may be provided that comprises single fully connected layer connecting the inputs to the outputs. In such an embodiment, the single fully connected layer is built with the "important" neurons as the inputs so that there is no need to determine the important neurons within the single fully connected layer.

After the initialization phase, i.e. phase 0, during a first phase of the evolutionary process, i.e. phase 1, the starting neural network from the initialization phase is grown by adding a layer of neurons and dense connections to this subset of neurons. It should be appreciated that a layer of dense connections, i.e. a fully connected layer, is a layer that connects all the input neurons from a previous layer to all the output neurons in the layer of dense connections. The initial weight values of the new connections between the added neurons and the neurons to which they are connected in the starting neural network are chosen such that the output neuron values of the starting neural network are not substantially perturbed, i.e. the outputs are not changed appreciably by the introduction of the new layer of dense connections, i.e. not changed more than a predetermined threshold amount. In some illustrative embodiments, this predetermined threshold amount may be zero such that no perturbation of the output values of the output neurons is caused by the setting of the weights on the new connections to the added neurons. In other illustrative embodiments, small perturbations may be permitted which do not cause a change in the classification output of the output neurons.

There are many ways of determining the initial weight values so that the output neuron values are unperturbed, i.e. changed more than a threshold amount. One way of introducing the fully connected layer and selecting the initial weight values for these connections is to introduce a layer of intermediate neurons equal to the number of input neurons and then setting the initial weight values to an identity matrix and a bias to zero, which makes the values of the intermediate neurons equal to the input neurons. By setting the weights and bias for the connections from the newly added intermediate layer to the output neurons to the weights and biases of the connections from the input layer neurons to the output layer neurons from phase 0 will ensure that the output neurons are unperturbed from phase 0. This is only one way of choosing the initial weight values and biases associated with the connections to and from the newly introduced intermediate layer.

By choosing the initial weight values of the connections such that the outputs of the output layer are not perturbed ensures that the new connections do not cause the neural network to forget what was learned through the initial training of the neural network. The newly grown, or expanded, neural network having the inserted layer of neurons, i.e. the newly grown layer, and new connections with weight values set to the initial weight value is then trained using a machine learning process involving a set of iterations or epochs, e.g., 5 epochs, which updates the initial weight values to an initially trained set of weight values for these new connections. This training process is used to determine which connection weight values are changing most quickly, not to get a full convergence of the loss function. The number of epochs to train would depend on the learning rate, i.e. the smaller the learning rate, the more epochs needed.

After having trained the expanded neural network in the first phase of the evolutionary process, during a second phase, i.e. phase 2, of the evolutionary process the expanded neural network's connections in the newly added layer are pruned. In one illustrative embodiment, the neural network connections in the newly grown layer that show the least change in their weight values from their initialized weight values after the training in the first phase are pruned, i.e. removed from the neural network model. In other illustrative embodiments, an absolute value of the weights is used to determine the most important neurons, e.g., the higher the absolute weight value, the more important the corresponding neuron.

In one illustrative embodiment, this pruning may involve a single operation for selecting the top N connections for each intermediate neuron of the newly grown layer based on these absolute weight values or the top N connections that had the relative most amount of change in their weight values, indicating that these connections and corresponding nodes are relatively more important to the operation of the neural network. The value of N is a tunable hyperparameter that may be set to a desired value depending on the particular implementation.

In other illustrative embodiments, this pruning operation may be iterative such that during this pruning operation of the second phase of the evolutionary process, after each instance of pruning the connections in the newly grown layer, the machine learning training operation is again performed for a number of epochs, thereby leading to updated weight values for the connections still remaining in the newly grown layer. With this iterative pruning operation, a fixed number of the lowest weighted connections of the newly grown layer are removed and the training is repeated for a fixed number of epochs. The pruning may then be terminated when all output neurons have exactly N connections to the input neurons.

In a third phase of the evolutionary process, i.e. phase 3, connections in the newly grown layer that remain after the pruning operation in the second phase, are merged by classifying the connections into "k" weight buckets. The number of buckets, k, is a hyperparameter that is set based on the dataset. In some illustrative embodiments, for example for the MNIST dataset, the value of k may be set to 1, meaning a single bucket is utilized. However, using more buckets (i.e., k>1) may provide better results for this and other datasets depending on the particular implementation.

The degree of similarity of the weight distribution determines whether the connections are merged into a single bucket or not. The "k" buckets then become the "k" custom filters of the newly grown layer. That is, merging weight variables into buckets is utilized to find similar patterns of feature combinations. Just as a convolution filter combines spatially nearby features in an image with the same set of weight variables, a custom convolution filter combines features from anywhere in the entire feature set with the same weight variables, thus passing useful features quickly to the output of the neural network. Each bucket, after the merging process, corresponds to a set of weight variables and thus, a filter.

After the "k" buckets are created, the weight variables associated with the incoming edges of the neurons within each bucket are merged. The weight vectors are sorted before they are merged, so the ordering of incoming edges for each neuron is different and this determines the shape of the filter. In one illustrative embodiment, the following formula is used to compute dissimilarity between the sorted weight vectors (W0 and W1) of two neurons:

$$S=\min(a,b)\|W0-(aW1+b)\|2$$

Here, min(a,b) represents minimization over values of real values of a and b. The higher the value of S, the more the neurons are dissimilar. This minimization problem can be solved by setting derivatives to zero. After generating pairwise dissimilarities, a known binning technique can be used to create "k" buckets for "n" neurons such that the sum of pairwise dissimilarities in each bucket is minimized.

The fourth phase of the evolutionary process, i.e. phase 4, involves re-initializing the weights of the pruned and merged neural network so that the output neuron values are unperturbed from the values after the initialization phase. The new neural network model is then retrained until the early stopping criteria are met. Reinitialization ensures that the network accuracy matches what was achieved after phase 1. Re-training then takes the neural network to a new local minimum value for the validation loss. After the third phase, the neural network is already trained but due to the large number of weight variables in the intermediate layer (i.e., before merging the weight variables), the neural network is prone to overfitting to the training dataset. The re-initializing and retraining performed in phase 4 is performed to reduce overfitting to the training dataset, thus finding a better local minimum for the validation loss.

Once the neural network model is retrained until the early stopping criteria are met, the neural network model may be deployed for runtime operation. Thus, through this evolutionary process implemented by the mechanisms of the illustrative embodiments, a specific customized filter for intermediate or hidden layer(s) of a neural network is generated. The neural network after phase 4 will have better accuracy on test data sets than the neural network available after the initialization phase, i.e. phase 0. Adding the newly grown layer improves the classification ability of the neural network as there are more neurons and more weight variables providing a better classification ability. However, when neural networks become too large they suffer from overfitting to the training data. Overfitting is not desirable because the neural network only does well on the training dataset and does not generalize well to new datapoints that are not in the training dataset. The evolutionary process of the illustrative embodiments avoid overfitting by pruning and merging weight variables after growing the neural network, in the manner previously described above.

The evolutionary process according to the mechanisms of the illustrative embodiments learns the shape of the custom filters from the evolution of the weight values on the connections. Due to this learning, the evolutionary process is able to leverage the acceleration in training offered by specialized hardware such as graphics processing units (GPUs). Thus, in comparison with known techniques, the evolutionary process of the present invention is much faster and more accurate with the same increase in neural network size, which translates to overall better neural network quality. Known techniques, such as the filter shaping technique proposed in Li et al. "Filter Shaping for Convolutional Neural Networks", ICLR 2017, do not currently employ software tools to accelerate these techniques on a GPU and thus, the present invention is relatively faster than these known techniques. Currently, the only way to get faster performance of these known techniques is to introduce approximations, as discussed previously, such as reducing the window for computing the covariance matrix, which results in lower prediction accuracy. The present invention achieves high accuracy with a relatively faster operation than these known techniques.

It should be appreciated that the phases of the evolutionary process may be performed for any number of new hidden layers, i.e. newly grown layers, in an iterative process. That is, for example, after having introduced a first newly grown layer and performed the evolutionary process with regard to phases 1-4 above, the resulting neural network trained to the early stopping criteria after phase 4 may serve as the initially trained neural network for a second iteration starting at phase 1. In this way, a second newly grown layer may be added to the neural network with connections connecting this second newly grown layer to the output neurons of the output layer and connections to a previous layer (previously connected directly to the output layer). In this situation, the previous layer would be the intermediate layer or hidden layer added in the previous iteration, i.e. the newly grown layer from the previous iteration of the evolutionary process. Thus, multiple newly grown layers may be added to the neural network to thereby grow the neural network, and prune and merge the connections of the newly grown layers of the neural network, until a desired accuracy in the operation of the neural network is achieved.

It should be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1A-1F are example diagrams illustrating phases of an evolutionary process of custom filter generation for neural network synthesis in accordance with one illustrative embodiment. The operations outlined in FIGS. 1A-1F are performed by a neural network synthesis engine configured with computer logic in accordance with the illustrative embodiments to perform the various functions attributed to the various phases of the evolutionary process. This evolutionary process is performed automatically once initiated until a final custom filter is generated for the neural network and the resulting neural network is retrained to an initial trained state for deployment.

Figure 1A:
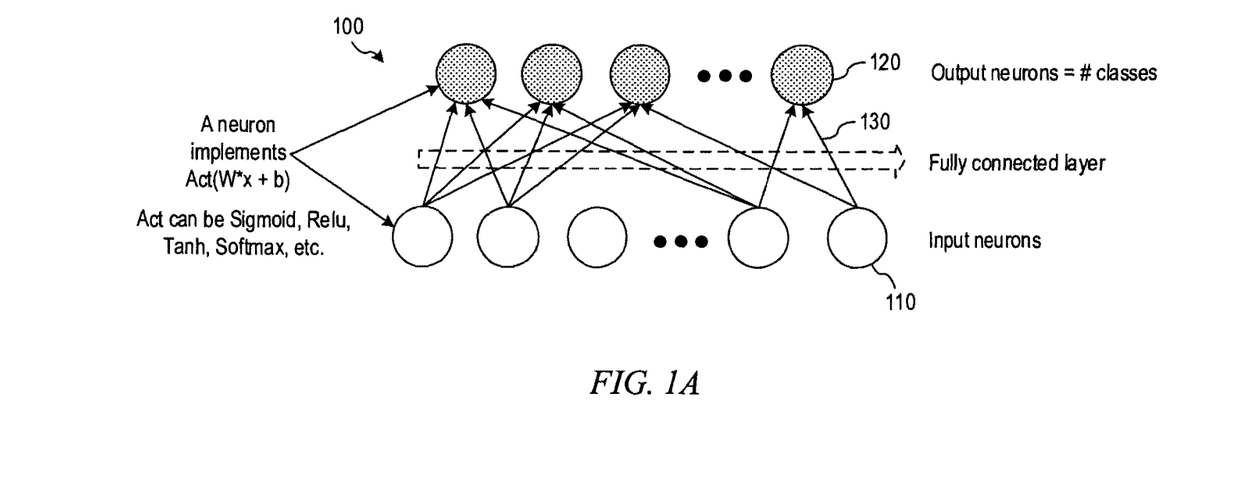
FIGS. 1A-1F are example diagrams illustrating phases of an evolutionary process of custom filter generation for neural network synthesis in accordance with one illustrative embodiment.

FIG. 1A is an example diagram illustrating a neural network model as a set of neurons or nodes 110, 120 with corresponding connections 130, during an initialization phase, or phase 0, of the evolutionary process. In phase 0, or the initialization phase, as previously mentioned above, given a neural network 100 that has been trained until early stopping criteria are met, a subset of neurons 110, 120 in the neural network are selected that are determined to be "important" for the given dataset and artificial intelligence operation being performed by the neural network 100, e.g., a classification task. In one illustrative embodiment, the neural network 100 may be the final fully connected layer of an existing neural network that is either manually designed or auto-generated from another neural network architecture generation engine. Alternatively, as a more general application of the evolutionary process, the set of input neurons or nodes 110 may represent a subset of "important" neurons from an existing neural network, as discussed previously. If an initial neural network is not available, the input neurons or nodes 110 can also represent all or a subset of input features of a given dataset. In this case, a neural network is initialized with a fully connected layer connecting the input neurons or nodes 110 to the output neurons or nodes 120.

Assuming that there are "n" input neurons 110 and m output neurons 120, the operation performed in the fully connected layer can be expressed as y=Act(W*x+B), where "x" is the n-dimensional vector containing values of the input neurons 110, y is the m-dimensional vector containing values of the output neurons 120, W is the m-by-n (m×n) dimensional matrix containing weight variables, B is the m-dimensional vector containing bias variables, and Act is an activation function, e.g., Relu, Tanh, Sigmoid, etc. In a neural network, inputs are provided to artificial neurons and a weight is associated with each input. Weight increases the steepness of the activation function (Act). Thus, the weight determines how fast the activation function will trigger whereas bias is used to delay the triggering of the activation function. The initial values of the weights (W) and biases (B) are obtained by training the initial neural network until the early stopping criteria are met.

Figure 1B:
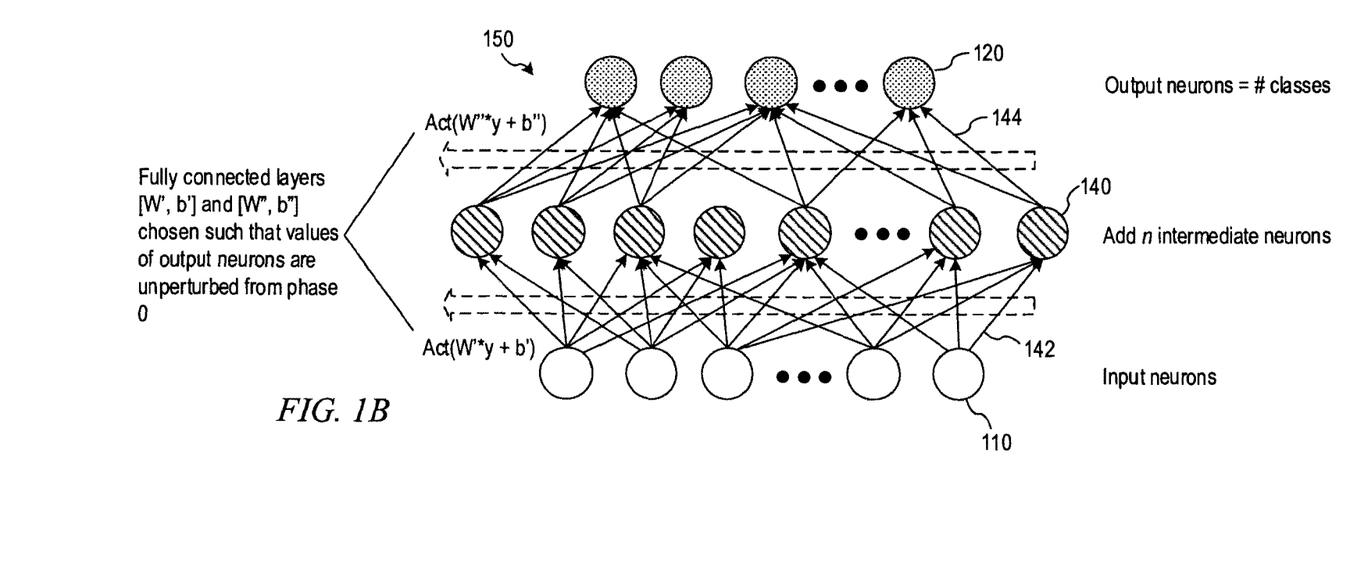

After the initialization phase in FIG. 1A, during a first phase of the evolutionary process, as shown in FIG. 1B, the starting neural network 100 from the initialization phase shown in FIG. 1A is grown by adding a layer of neurons 140 and dense connections 142, 144 to this subset of neurons in network 100. The initial weight values of the new connections 142, 144 between the added neurons 140 and the neurons 110, 120 to which they are connected in the starting neural network 100 are chosen such that the output neuron values 120 of the starting neural network 100 are not perturbed, i.e. the outputs are not changed appreciably by the introduction of the new layer of dense connections 142, 144.

In the depicted example, the starting neural network 100 is grown or expanded by adding the hidden layer of neurons 140 comprising "l" hidden neurons. The connections between the input neurons 110 and the new hidden neurons 140 are fully connected. The operation performed by this new layer of hidden neurons 140 with regard to these connections between nodes 110 and 140 can be expressed as z=Act(W'*x+B'), where z is an l-dimensional vector containing values of the hidden neurons, W' is an l×n-dimensional weight matrix, B' is an l-dimensional bias vector, and Act is the activation function of the new layer of hidden neurons 140 (hidden layer). In the case where the new hidden nodes 140 are selectively connected, the missing connections can be represented as zeros in the weight matrix W'.

Connections between the hidden layer neurons 140 and the output neurons 120 are fully connected. The operation performed by the new layer of hidden neurons 140 with regard to the connections between nodes 140 and 120 can be expressed as y=Act(W''*z+B'') where y is an m-dimensional vector containing values of the output neurons 120, W'' is an m×l-dimensional weight matrix, B'' is an m-dimensional bias vector, and Act is the activation function.

In order to ensure continuity in the training of the evolving neural network, the initial values for [W', B'] and [W'', B''] are derived from the trained values of [W, B] at the end of the initialization phase, or phase 0, as shown in FIG. 1A. The initial values can be achieved in many different ways. In one illustrative embodiment, assuming each input neuron 110 connects to 3 hidden layer neurons 140, the weight variable for these neurons 140 can be initialized to w1, w2, w3 such that the sum (w1, w2, w3)=1. The weight variable for connections from other neurons in the input layer 110 to these 3 neurons can be initialized to 0. Such an initial value assignment ensures continuity in the training process, where continuity means that the neural network does not forget what was learned through the initial training of the neural network.

In some illustrative embodiments, the values for n, W', B', W'', and B'' may be chosen by choosing n (number of intermediate or hidden layer neurons 140) to be equal to the number of input neurons 110. Then, by setting W' to an identity matrix and B' to 0 makes the values of the intermediate or hidden layer neurons 140 equal to the input neurons 110. Then setting W''=W (from phase 0) and B''=B (from phase 0) will keep the values of the output neurons 120 unperturbed from the initialization phase, i.e. phase 0.

The newly grown, or expanded, neural network 150 having the inserted layer of hidden neurons 140, i.e. the newly grown layer 140, and new connections 142, 144 with weight values set to the initial weight value, is then trained using a machine learning process involving a set of iterations or epochs which updates the initial weight values to an initially trained set of weight values for these new connections.

Figure 1C:
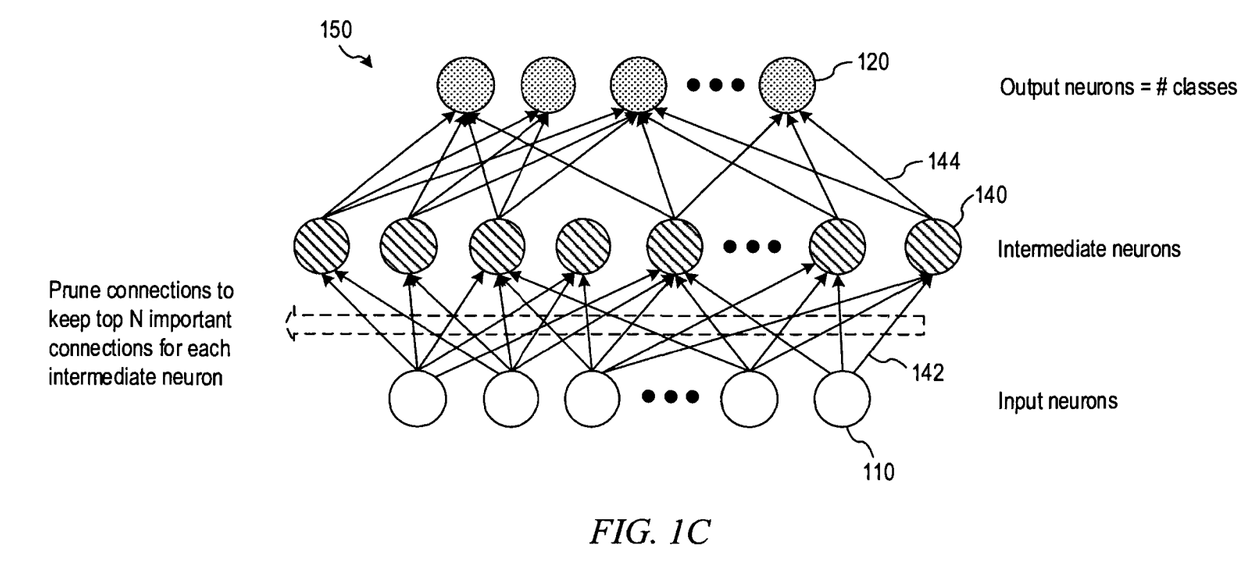

After having trained the expanded neural network in the first phase of the evolutionary process, during a second phase of the evolutionary process, as shown in FIG. 1C, the expanded neural network's 150 connections 142, 144 in the newly added layer 140 are pruned. That is, the neural network connections 142, 144 in the newly grown layer 140 are pruned in accordance with a predetermined pruning metric. Various types of pruning metrics may be utilized to prune these connections 142, 144 including pruning according to the values of weight variables relative to one or more thresholds, absolute value of weight variables relative to one or more thresholds, magnitude of change in weight values over several epochs or iterations of the machine learning, or the like. For example, in one illustrative embodiment, connections that show the least change in their weight values from their initialized weight values after the training in the first phase (FIG. 1B) are pruned, i.e. removed from the neural network model. In another illustrative embodiment, the absolute weight value of the connections after epochs of training is used to select the top N important connections, where importance is determined based on a relative ranking of the connections based on their absolute weight value, and where the higher the absolute weight value, the higher the importance of the connection.

Pruning may be performed as a single operation or in multiple operations applied iteratively. With pruning performed in multiple operations, after each instance of pruning the connections in the newly grown layer, the machine learning training operation is again performed for a number of epochs, thereby leading to updated weight values for the connections still remaining in the newly grown layer. This process may be repeated until no further pruning of the connection is possible, i.e. N connections are left for each hidden layer neuron 140. It is the connections in the newly grown layer, i.e. the hidden layer neurons 140 that are pruned because the custom filter is being designed for this hidden layer 140. Using this evolutionary process in an iterative manner, the neural network may be grown layer by layer.

Figure 1D:
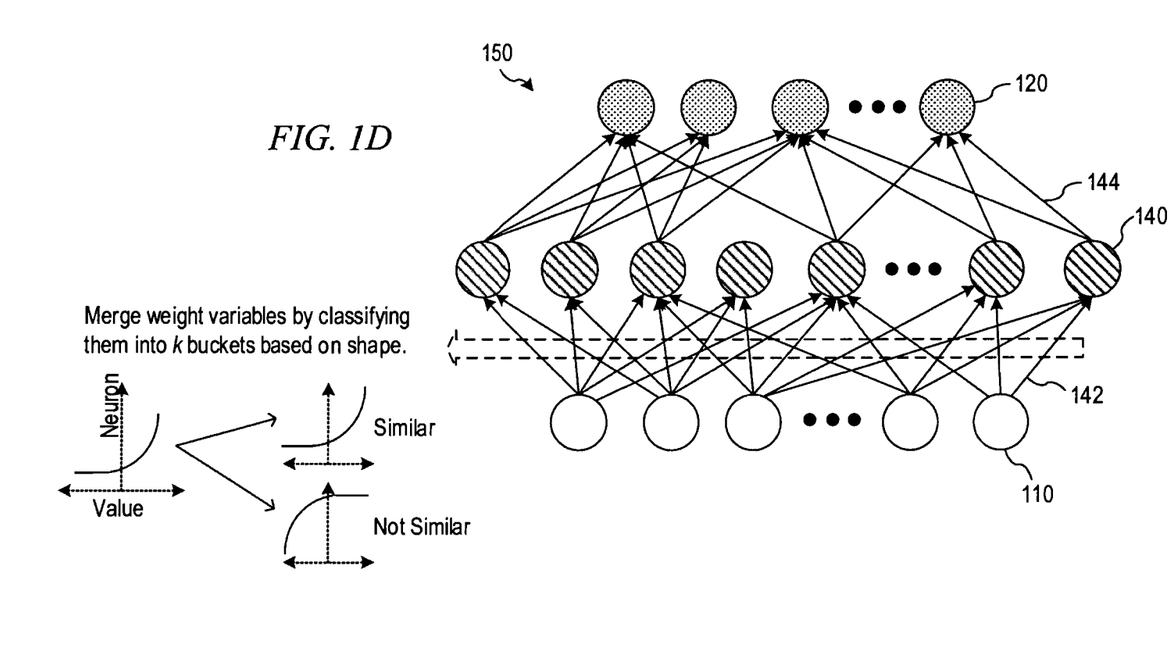

In a third phase of the evolutionary process, as shown in FIG. 1D, connections in the newly grown layer 140 that remain after the pruning operation in the second phase (FIG. 1C), are merged by classifying the connections into "k" weight buckets. That is, the weight variable values for the N connections of each of the hidden layer neurons 140 are merged into "k" buckets of N weight variables each. Merging of weight variables takes place based on the similarity of shape of the distribution of the weight variables. One way of measuring similarity is to use the L−2 distance of the normalized values of weight variables. For example, [1.2, 0.6, 0.3] has a shape more similar to [2, 1, 0.5] than to [1, 0.9, 0.8].

Figure 1E:
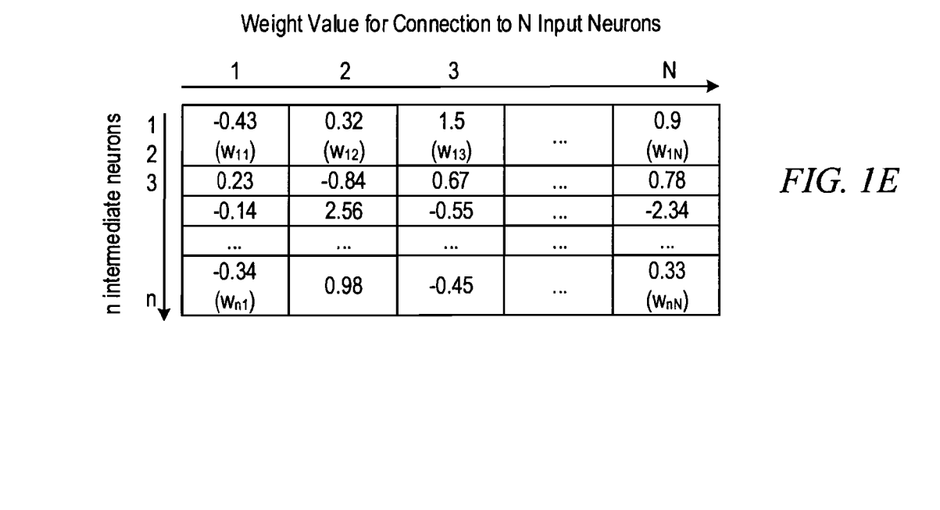

As shown in FIG. 1E, in order to perform the merging of the weight variables for the N connections of each of the hidden layer neurons 140 to the input layer neurons 110, the weight values for each hidden layer neuron 140 are sorted. In the depiction in FIG. 1E, each row corresponds to one of the n hidden layer neurons 140 and each column corresponds to an input neuron, where the intersection of the row and column corresponds to a weight value of the connection between the corresponding hidden layer neuron and the input layer neuron. After sorting, the weight variables ($w_{11}$, $w_{12}$, . . . , $w_{1N}$) will be rearranged in each row according to the weigh values. The weight variables in each column are merged into a single convolutional variable by replacing the weight variables ($w_{11}$, $w_{12}$, . . . $w_{1N}$) with a single weight variable whose value is determined in the next phase by re-initializing and re-training the new weight variables. After merging there will be a total of N convolution variables and n intermediate or hidden neurons 140. Together, this constitutes a custom convolution filter.

Figure 1F:
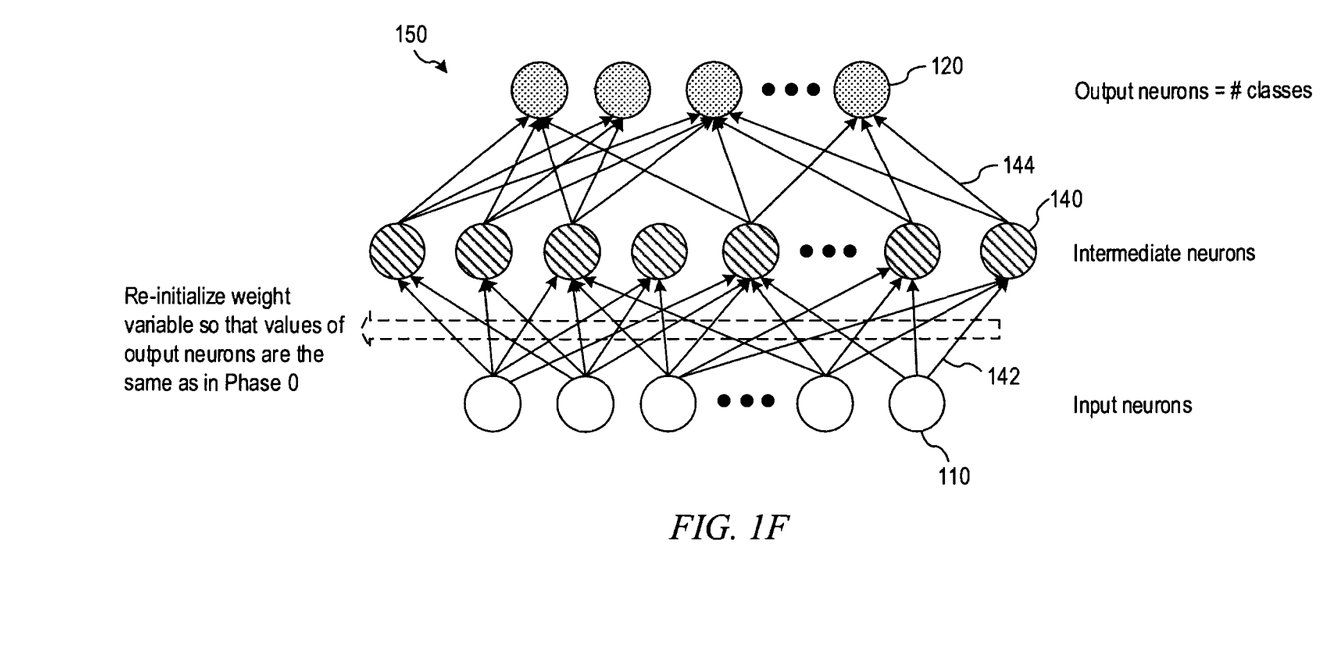

The fourth phase of the evolutionary process, as shown in FIG. 1F, involves re-initializing the weights of the pruned and merged neural network 160 so that the output neuron 120 values are unperturbed from the values after the initialization phase, i.e. phase 0 as shown in FIG. 1A. For example, one way of choosing values for the merged variables of the hidden layer 140 is to set the weight variables to [1, 0, 0, . . . , 0] (a vector of length N) and the bias variable to 0. Then resetting the values of the variables in the output layer 120 to the values from phase 0 will keep values of the output neurons unperturbed from phase 0. The new neural network model 160 is then retrained until the early stopping criteria are met. Once the neural network model 160 is retrained until the early stopping criteria are met, the neural network model may be deployed for runtime operation. Thus, through this evolutionary process implemented by the mechanisms of the illustrative embodiments, a specific customized filter for intermediate or hidden layer(s) of a neural network is generated.

From the above, it is clear that the mechanisms of the illustrative embodiments are specifically directed to an improved computer tool which improves the way in which neural network models are synthesized. That is, the mechanisms of the illustrative embodiments are specifically directed to improving computer technology and specifically directed to the problems arising in the synthesis of computer implemented neural networks. While the illustrative embodiments may be utilized in many different types of data processing environments, these data processing environments are specifically configured to perform the computer operations of the illustrative embodiments as described herein. Hence, while the hardware and basic software, e.g., operating systems, basic input/output system (BIOS), and the like, may be generic, such generic mechanisms are specifically configured to implement the logic and functionality of the illustrative embodiments, thereby resulting in a specialized computing systems.

Figure 2:
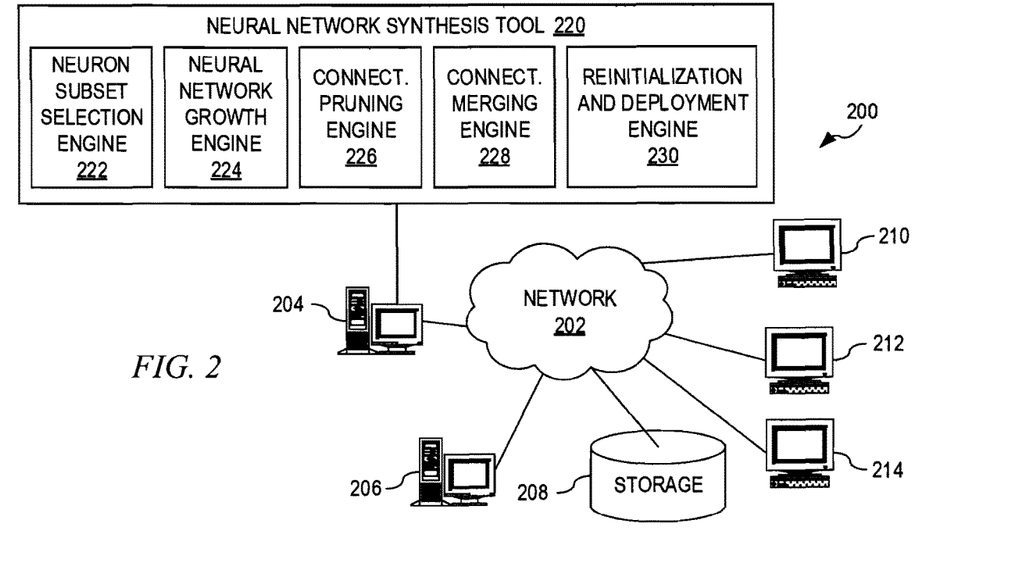
FIG. 2 is an example diagram of a distributed data processing system in which aspects of the illustrative embodiments may be implemented.
Figure 3:
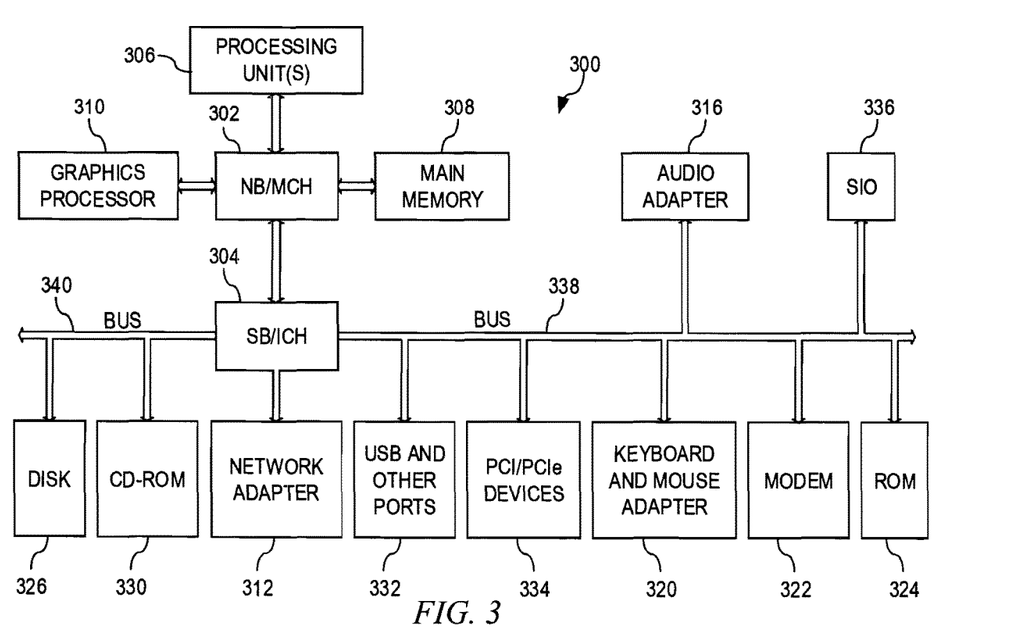
FIG. 3 is an example block diagram of a computing device in which aspects of the illustrative embodiments may be implemented.

FIGS. 2 and 3 are provided as example environments in which aspects of the illustrative embodiments may be implemented. It should be appreciated that FIGS. 2 and 3 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

As shown in FIG. 2, one or more of the computing devices, e.g., server 204, may be specifically configured to implement a neural network synthesizing tool 220. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automatic building of a custom convolution filter for a neural network using an automated evolutionary process as previously described above, so that a neural network model may be synthesized using the custom convolution filter.

As shown in FIG. 2, the neural network synthesizing tool 220 comprises a neuron subset selection engine 222, a neural network growth engine 224, a connection pruning engine 226, a connection merging engine 228, and a reinitialization and deployment engine 230. In response to a request being sent to the neural network synthesis tool 220, such as from a client computing device 210, a server computing device 206, or the like, the neural network synthesis tool 220 performs operations in accordance with one or more of the illustrative embodiments described previously to generate a customized convolution filter for a neural network to thereby synthesize a neural network for deployment. Along with the request, an initially trained neural network, trained until early stopping criteria are met, or alternatively a default neural network comprising a single fully connected layer connecting input neurons of an input layer with output neurons of an output layer is utilized and trained to the early stopping criteria are met. The neuron subset selection engine 222 performs the operations described previously for selecting a subset of the neurons in the initially trained neural network for use in generating the customized convolution filter (initialization phase or phase 0 of the evolutionary process).

The neural network growth engine 224 performs the operations previously described for growing the selected subset of neurons by introducing a new hidden layer of neurons between the input layer and output layer neurons (phase 1 of the evolutionary process). The connection pruning engine 226 then performs the operations previously described for pruning the connections between the input layer and the newly introduced hidden layer (phase 2 of the evolutionary process). The connection merging engine 228 performs the operations previously described for merging connections remaining after the pruning operation into merged connections (phase 3 of the evolutionary process). The reinitialization and deployment engine 230 performs the operations previously described for reinitializing the neural network weights and training the neural network until early stopping criteria are met and then making the reinitialized and initially trained neural network available for deployment (phase 4 of the evolutionary process). The custom synthesized neural network may then be provided back to the requestor and/or otherwise made accessible to the requestor for use.

As noted above, the mechanisms of the illustrative embodiments utilize specifically configured computing devices, or data processing systems, to perform the operations for automatic custom convolution filter generation and neural network synthesis based on the generated custom convolution filter. These computing devices, or data processing systems, may comprise various hardware elements which are specifically configured, either through hardware configuration, software configuration, or a combination of hardware and software configuration, to implement one or more of the systems/subsystems described herein. FIG. 3 is a block diagram of just one example data processing system in which aspects of the illustrative embodiments may be implemented. Data processing system 300 is an example of a computer, such as server 204 in FIG. 2, in which computer usable code or instructions implementing the processes and aspects of the illustrative embodiments of the present invention may be located and/or executed so as to achieve the operation, output, and external effects of the illustrative embodiments as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 300.

As a server, data processing system 300 may be, for example, an IBM eServer™ System p® computer system, Power™ processor based computer system, or the like, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described herein with regard to the neural network synthesizing tool.

Those of ordinary skill in the art will appreciate that the hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
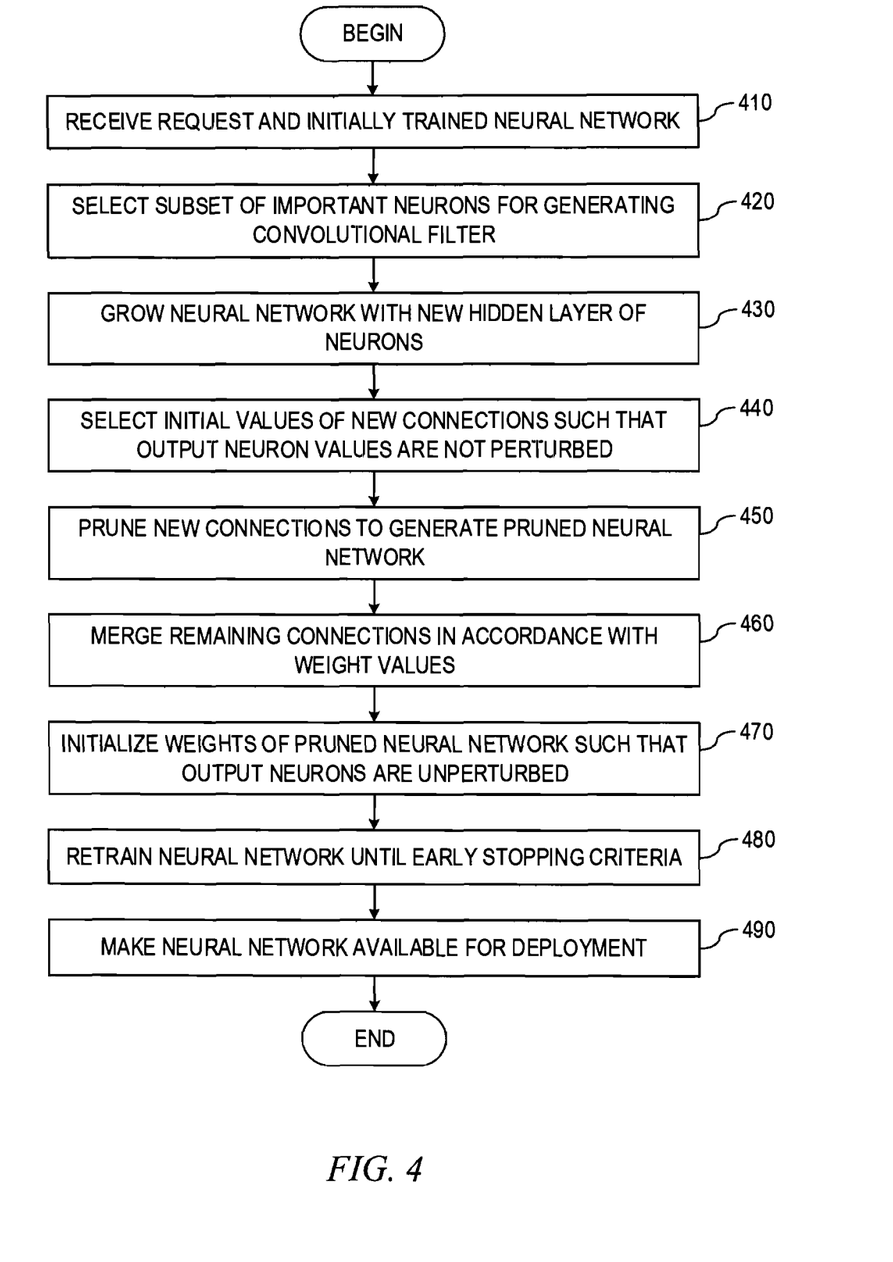
FIG. 4 is a flowchart outlining an example operation for performing custom filter generation for neural network synthesis in accordance with one illustrative embodiment.

FIG. 4 is a flowchart outlining an example operation for performing custom filter generation for neural network synthesis in accordance with one illustrative embodiment. The operation outlined in FIG. 4 may be implemented by a neural network synthesizing tool in accordance with one or more of the illustrative embodiments described above.

As shown in FIG. 4, the operation starts by initiating automated synthesis of a neural network, such as by receiving a request from a client computing device or the like, with an initially trained neural network model, e.g., trained to a predetermined initial stopping criteria are met (step 410). A subset of important neurons in the initially trained neural network model are selected for use in generating the convolutional filter (step 420). The selected neurons constitute an initial selected neural network model. The initial selected neural network model is grown, to generate an expanded selected neural network model, by introducing an intermediate or hidden layer of neurons between the input neurons of the initial selected neural network model and the output neurons of the initial selected neural network model (step 430). The initial values of the new connections in the expanded selected neural network model are chosen such that the output neuron values in the output layer are not perturbed (step 440). The new connections are then iteratively pruned between sets of epochs or iterations of training of the expanded selected neural network model to generate a pruned neural network model (step 450). The remaining connections between the input layer neurons and the hidden layer neurons of the pruned neural network model are merged in accordance with their weight values (step 460). The weights of the pruned neural network model are initialized such that the output neuron values of the output layer are unperturbed from the initialized state in step 410 (step 470). The neural network model is then retrained until the early stopping criteria are met (step 480) and the neural network model is then made available for deployment for runtime operation (step 490). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for synthesizing a computer implemented neural network with a custom convolution filter, the method comprising:

receiving an initially trained neural network comprising an initial set of weight values associated with connections in the initially trained neural network;

modifying the initially trained neural network by introducing a first new hidden layer of neurons and new connections that connect the first new hidden layer of neurons to an output layer of neurons of the initially trained neural network and a previous layer of neurons previously directly connected to the output layer of neurons to generate a modified neural network;

training the modified neural network through one or more epochs of machine learning to generate modified weight values for the new connections;

pruning the new connections based on the modified weight values to remove a subset of the new connections and leaving remaining connections in the modified neural network;

performing a merge operation on the remaining connections in the modified neural network to generate a custom convolution filter and modified neural network comprising the custom convolution filter; and retraining the modified neural network with one or more additional epochs of machine learning to generate a trained neural network, having the custom convolution filter, for deployment, wherein the merge operation performed on the remaining connections in the modified neural network comprises:

generating a predetermined number of weight buckets;

determining a measure of similarity or dissimilarity between weight vectors of neurons in the first new hidden layer;

binning neurons into weight buckets of the predetermined number of weight buckets based on the measure of similarity or dissimilarity; and for each weight bucket, merging connections associated with neurons in the weight bucket together to generate a single merged neuron and corresponding merged set of connections.

2. The method of claim 1, further comprising repeating the modifying of the initially trained neural network, training the modified neural network, pruning the new connections based on the modified weight values, and performing the merge operation for a second new hidden layer of neurons connected to the first new hidden layer.

3. The method of claim 1, further comprising:
selecting a subset of neurons of the initially trained neural network as the previous layer of neurons.

4. The method of claim 1, wherein modifying the initially trained neural network further comprises setting weights of the new connections to values which do not perturb output values of output neurons of the output layer of neurons more than a predetermined threshold amount.

5. The method of claim 1, wherein the first hidden layer of neurons comprises a same number of neurons as neurons in the previous layer of neurons, and wherein weights and biases for the new connections are set to be the same as the weights and biases of connections between the previous layer of neurons and the output layer of neurons.

6. The method of claim 1, wherein pruning the new connections comprises selecting the remaining connections as a predetermined number of the new connections that have a relatively larger amount of change in associated weights, as a result of the training, than other ones of the new connections.

7. The method of claim 1, wherein pruning the new connections comprises selecting the remaining connections as a predetermined number of the new connections having a relatively larger associated weight, as a result of the training, than other ones of the new connections.

8. The method of claim 1, wherein pruning the new connections is performed in an iterative manner wherein in each iteration of the pruning, a fixed number of lowest weighted new connections are removed and the training is repeated for a fixed number of epochs.

9. The method of claim 1, wherein the method is executed by a graphics processing unit (GPU) of the data processing system utilizing acceleration capabilities of the GPU.

10. A computer program product comprising a computer readable storage medium having a computer readable program stored therein, wherein the computer readable program, when executed on a computing device, causes the computing device to synthesize a computer implemented neural network with a custom convolution filter, at least by:

receiving an initially trained neural network comprising an initial set of weight values associated with connections in the initially trained neural network;

modifying the initially trained neural network by introducing a first new hidden layer of neurons and new connections that connect the first new hidden layer of neurons to an output layer of neurons of the initially trained neural network and a previous layer of neurons previously directly connected to the output layer of neurons to generate a modified neural network;

training the modified neural network through one or more epochs of machine learning to generate modified weight values for the new connections;

pruning the new connections based on the modified weight values to remove a subset of the new connections and leaving remaining connections in the modified neural network;

performing a merge operation on the remaining connections in the modified neural network to generate a custom convolution filter and modified neural network comprising the custom convolution filter; and retraining the modified neural network with one or more additional epochs of machine learning to generate a trained neural network, having the custom convolution filter, for deployment, wherein the merge operation performed on the remaining connections in the modified neural network comprises:

generating a predetermined number of weight buckets;

determining a measure of similarity or dissimilarity between weight vectors of neurons in the first new hidden layer;

binning neurons into weight buckets of the predetermined number of weight buckets based on the measure of similarity or dissimilarity; and for each weight bucket, merging connections associated with neurons in the weight bucket together to generate a single merged neuron and corresponding merged set of connections.

11. The computer program product of claim 10, wherein the computer readable program further causes the computing device to synthesize the computer implemented neural network with a custom convolution filter, at least by repeating the modifying of the initially trained neural network, training the modified neural network, pruning the new connections based on the modified weight values, and performing the merge operation for a second new hidden layer of neurons connected to the first new hidden layer.

12. The computer program product of claim 10, wherein the computer readable program further causes the computing device to synthesize the computer implemented neural network with a custom convolution filter, at least by selecting a subset of neurons of the initially trained neural network as the previous layer of neurons.

13. The computer program product of claim 10, wherein modifying the initially trained neural network further comprises setting weights of the new connections to values which do not perturb output values of output neurons of the output layer of neurons more than a predetermined threshold amount.

14. The computer program product of claim 10, wherein the first hidden layer of neurons comprises a same number of neurons as neurons in the previous layer of neurons, and wherein weights and biases for the new connections are set to be the same as the weights and biases of connections between the previous layer of neurons and the output layer of neurons.

15. The computer program product of claim 10, wherein pruning the new connections comprises selecting the remaining connections as a predetermined number of the new connections that have a relatively larger amount of change in associated weights, as a result of the training, than other ones of the new connections.

16. The computer program product of claim 10, wherein pruning the new connections comprises selecting the remaining connections as a predetermined number of the new connections having a relatively larger associated weight, as a result of the training, than other ones of the new connections.

17. The computer program product of claim 10, wherein pruning the new connections is performed in an iterative manner wherein in each iteration of the pruning, a fixed number of lowest weighted new connections are removed and the training is repeated for a fixed number of epochs.

18. An apparatus comprising:
a processor; and
a memory coupled to the processor, wherein the memory comprises instructions which, when executed by the processor, cause the processor to:
synthesize a computer implemented neural network with a custom convolution filter, at least by:
receiving an initially trained neural network comprising an initial set of weight values associated with connections in the initially trained neural network;
modifying the initially trained neural network by introducing a first new hidden layer of neurons and new connections that connect the first new hidden layer of neurons to an output layer of neurons of the initially trained neural network and a previous layer of neurons previously directly connected to the output layer of neurons to generate a modified neural network;
training the modified neural network through one or more epochs of machine learning to generate modified weight values for the new connections;
pruning the new connections based on the modified weight values to remove a subset of the new connections and leaving remaining connections in the modified neural network;
performing a merge operation on the remaining connections in the modified neural network to generate a custom convolution filter and modified neural network comprising the custom convolution filter; and
retraining the modified neural network with one or more additional epochs of machine learning to generate a trained neural network, having the custom convolution filter, for deployment, wherein the merge operation performed on the remaining connections in the modified neural network comprises:
generating a predetermined number of weight buckets;
determining a measure of similarity or dissimilarity between weight vectors of neurons in the first new hidden layer;
binning neurons into weight buckets of the predetermined number of weight buckets based on the measure of similarity or dissimilarity; and
for each weight bucket, merging connections associated with neurons in the weight bucket together to generate a single merged neuron and corresponding merged set of connections.

* * * * *